US 011331864B2

(12) United States Patent
Roberts

(10) Patent No.: US 11,331,864 B2
(45) Date of Patent: May 17, 2022

(54) METHOD AND SYSTEM FOR RESIN INFUSING A COMPOSITE PREFORM

(71) Applicant: The Boeing Company, Chicago, IL (US)

(72) Inventor: Richard Roberts, Victoria (AU)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 15/591,903

(22) Filed: May 10, 2017

(65) Prior Publication Data

US 2017/0348920 A1    Dec. 7, 2017

(30) Foreign Application Priority Data

Jun. 6, 2016 (AU) ................................ 2016203751

(51) Int. Cl.
*B29C 70/44* (2006.01)
*B29C 70/54* (2006.01)
(Continued)

(52) U.S. Cl.
CPC .......... *B29C 70/443* (2013.01); *B29C 70/548* (2013.01); *B29K 2101/12* (2013.01); *B29K 2105/06* (2013.01); *B29K 2995/0012* (2013.01)

(58) Field of Classification Search
CPC ... B29C 70/443; B29C 70/547; B29C 70/548; B29C 70/549; B29C 43/12;
(Continued)

(56) References Cited

U.S. PATENT DOCUMENTS 6,406,081 B1 * 6/2002 Mahfet .................. B60R 19/18
293/133
6,406,659 B1 * 6/2002 Lang .................. B29C 33/0066
264/102
(Continued)

FOREIGN PATENT DOCUMENTS

JP    2004130723 A  *  4/2004
JP    2004130723 A      4/2004
JP    2005047131 A  *  2/2005

OTHER PUBLICATIONS

Machine translation of Japanese Patent Publication No. JP-2005047131A, originally published Feb. 2005 (Year: 2005).*
(Continued)

*Primary Examiner* — Michael A Tolin

(57) ABSTRACT

Resin infusing a composite preform includes placing a first vacuum bagging film over a tool surface and the composite preform to define a sealed first chamber. A bridge structure has an underside defining a cavity above the first vacuum bagging film. A second vacuum bagging film is placed over the first vacuum bagging film and the bridge structure to define a sealed second chamber. At least partial vacuum pressure is applied to the first chamber to drive resin from a resin supply through the first chamber, infusing the composite preform with resin. Partial vacuum pressure is applied inside the second chamber and an exterior pressure is applied outside the second vacuum bagging film while. The exterior pressure exceeds the pressure applied to the first and second chambers, thereby compacting the composite preform outside of a region, with the bridge supporting the second vacuum bagging film against the exterior pressure.

20 Claims, 5 Drawing Sheets

(51) Int. Cl.
*B29K 101/12* (2006.01)
*B29K 105/06* (2006.01)

(58) Field of Classification Search
CPC ........ B29C 43/3642; B29C 2043/3644; B29C 2043/3657; B29C 70/44; B29C 70/446; B29C 70/54; B29C 70/542; B29C 70/544; B29C 70/546; B29K 2101/12; B29K 2105/06; B29K 2995/0012
See application file for complete search history.

(56) References Cited

U.S. PATENT DOCUMENTS

| | | | | |
|---|---|---|---|---|
| 6,586,054 | B2* | 7/2003 | Walsh | B29C 70/443 264/101 |
| 8,298,473 | B2* | 10/2012 | Dull | B29C 70/54 264/511 |
| 2005/0253309 | A1 | 11/2005 | Hou et al. | |
| 2007/0063393 | A1* | 3/2007 | Vernin | B29C 70/443 264/511 |
| 2011/0046771 | A1* | 2/2011 | Alms | B29C 70/443 700/114 |
| 2012/0068382 | A1* | 3/2012 | Alms | B29C 70/443 264/413 |
| 2013/0099426 | A1 | 4/2013 | Heim et al. | |

OTHER PUBLICATIONS

Search Report for related European Application No. EP17172557.5; report dated Dec. 12, 2017.
Office Action for related Japanese Application No. 2017-106082; report dated Mar. 26, 2019.
Korean Patent Office, Office Action for related Korean Application No. 10-2017-0051684, dated Sep. 15, 2020.
Canadian Patent Office, Office Action for related Canadian Application No. 2,962,874, dated Feb. 13, 2020.
Canadian Patent Office, Office Action for related Canadian Application No. 2,962,874, dated Jul. 31, 2020.
Australian Patent Office, Office Action for Application No. 2016203751, dated Oct. 29, 2021.

* cited by examiner

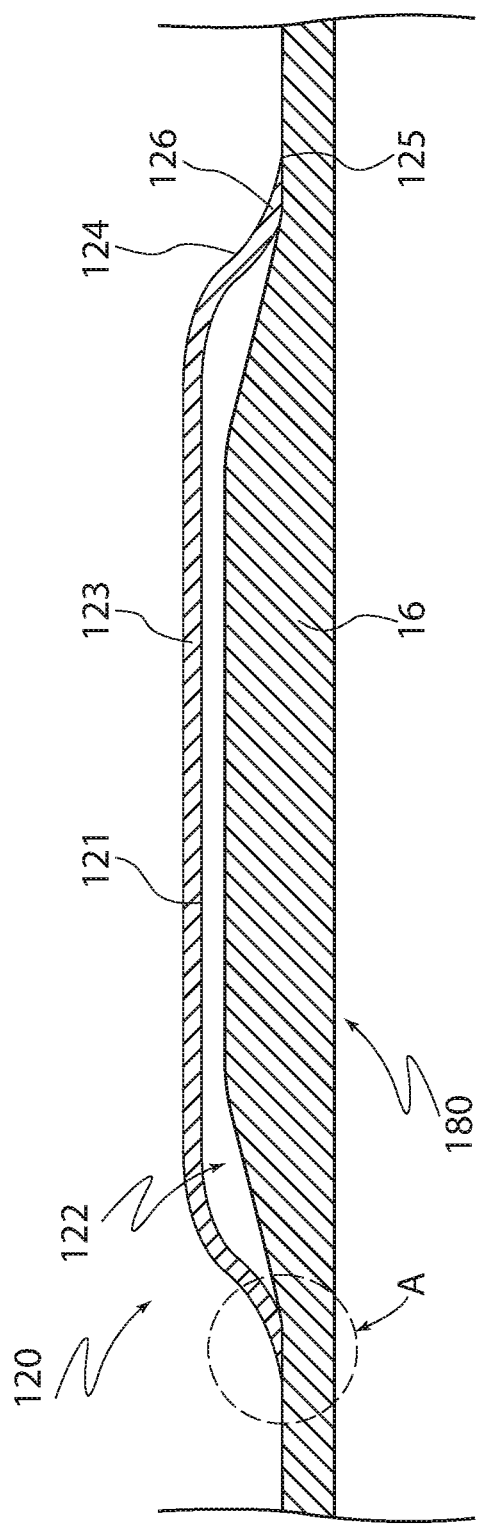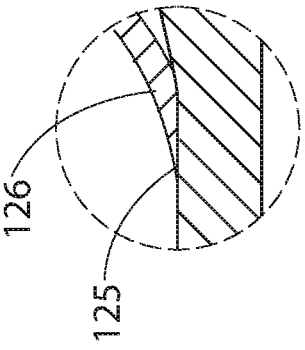
Fig. 4
Fig. 5

METHOD AND SYSTEM FOR RESIN INFUSING A COMPOSITE PREFORM

FIELD

The present disclosure generally relates to the fabrication of composite structures and in particular relates to a method and system for resin infusing a composite preform.

BACKGROUND

A current method for fabricating composite structures utilises a resin infusion process to infuse a composite preform, formed of multiple plies each formed of composite fibres, with resin prior to curing of the resin to form a composite structure. According to a current method, the composite preform is located on a tool surface and a vacuum bagging film is placed over the tool surface to cover the composite preform and sealed to form a sealed chamber between the tool surface and vacuum bagging film. Resin is infused through the composite preform by application of vacuum pressure to a downstream end of the sealed chamber, creating a pressure differential between the upstream resin supply and the downstream end of the sealed chamber, driving resin from the resin supply through the composite preform. Once the resin has been infused throughout the preform, the entire assembly is heated, typically in an oven, to cure the resin and thus form the composite structure.

Resin infuses through the composite preform with a wavefront that may or may not progress evenly across the lateral extent of the preform. The speed of resin infusion across the wavefront may become limited by the size of the composite preform, as well as other factors like the viscosity of the resin or the permeability of the composite preform. Variations in the geometry of the composite preform, particularly variations in thickness, also effect the local speed of resin infusion. Thicker regions of a composite preform require an increased volume of resin to fully infuse the thicker region. Where the speed of the infusion through the thicker region is insufficient, local dry spots or resin starvation may result. A form of locally thickened region where dry spots may be experienced is a "padup", where additional plies are utilised to build up the thickened region. Padups are typically utilised in areas of a composite structure subject to increased local stresses, such as at metal fitting attachment points. Local dry spots or resin starvation may also result from other factors, including the specific resin infusion strategy or other local geometry factors.

The present disclosure is made bearing the above problem in mind.

SUMMARY

The present disclosure is generally directed to a method and system for resin infusing a composite preform. According to embodiments of the present disclosure, a bridge structure is utilised in a double vacuum bagging film arrangement. The bridge structure is located over a first (lower) vacuum bagging film over a region of a composite preform and supporting an upper (second) vacuum bagging film against exterior atmospheric pressure applied whilst infusing the composite preform. The first vacuum bagging film is thus not subject to atmospheric pressure located in a cavity under the bridge structure, such that the composite preform is not compacted under atmospheric pressure in the region. The permeability of the region of the composite preform is thus not reduced by compaction, promoting increased resin flow during resin infusion, thereby assisting in ensuring the region of the composite preform is fully resin infused.

According to one aspect, the present disclosure provides a method of resin infusing a composite preform. A composite preform is located on an upper tool surface of a tool. A first vacuum bagging film is placed over the tool surface to cover the composite preform and define a sealed first chamber between the tool surface and the first vacuum bagging film. A bridge structure is located over the first vacuum bagging film over a region of the composite preform. The bridge structure has an underside defining a recess forming a cavity above the first vacuum bagging film. A second vacuum bagging film is placed over the first vacuum bagging film and the bridge structure to define a sealed second chamber between the first and second vacuum bagging films. A resin supply is communicated with the first chamber on an upstream side of the composite preform. At least partial vacuum pressure is applied to the first chamber on a downstream side of the composite preform to establish a pressure differential to drive resin from the resin supply through the first chamber, infusing the composite preform with resin. At least partial vacuum pressure is applied to the second chamber, including to the cavity, whilst infusing the composite preform. The exterior of the second vacuum bagging film is exposed to an exterior pressure whilst infusing the composite preform. The exterior pressure exceeds the pressure applied to the first and second chambers, thereby acting on the composite preform outside of the region to compact the composite preform outside of the region. The second vacuum bagging film is supported against the exterior pressure with the bridge structure whilst infusing the composite preform.

Typically, the exterior pressure is substantially equal to, or greater than, atmospheric pressure.

In preferred embodiments, locating the bridge structure comprises locating the bridge structure over a region of the composite preform susceptible to resin starvation.

Locating the composite preform may comprise locating a composite preform having a non-uniform thickness on the tool surface. Locating the bridge structure may comprise locating the bridge structure over a region of the composite preform having a thickness greater than an average thickness of the composite preform.

According to a second aspect, the present disclosure provides a method of fabricating a composite structure. A composite preform is resin infused according to the method of the first aspect defined above to form a resin infused composite preform. The resin infused composite preform is then cured.

In certain embodiments, following infusing the composite preform with resin, pressure may be applied to the second chamber, including to the cavity, with the pressure applied exceeding the at least partial vacuum pressure applied whilst infusing the composite preform.

In other embodiments, curing the resin infused composite preform comprises heating the resin infused composite preform to a cure temperature, with the bridge structure structurally failing during heating, collapsing the cavity, such that the bridge structure does not support the second vacuum bagging film during curing of the resin infused composite preform. Exterior pressure is thus allowed to act on the region of the composite preform following resin infusion.

In one or more specific embodiments, locating the bridge structure may comprise locating a bridge structure formed of a thermoplastic material with a melting temperature at or below the cure temperature, with the bridge structure structurally failing by melting.

The thermoplastic material may have a melting temperature of between 110° C. and 160° C., and more preferably between 120° C. and 140° C.

According to a third aspect, the present disclosure provides a resin infusion system for resin infusing a composite preform. The system includes a tool having an upper tool surface receiving a composite preform to be resin infused. A first vacuum bagging film covers the composite preform to define a sealed first chamber between the first vacuum bagging film and the tool surface. A second vacuum bagging film covers the said first vacuum bagging film to define a sealed second chamber between the first and second vacuum bagging films. A bridge structure is located in the second chamber over a region of the composite preform. The bridge structure supports the second vacuum bagging film and has an underside defining a recess forming a cavity above the first vacuum bagging film. A resin supply communicates with the first chamber on an upstream side of the composite preform. A vacuum source communicates with the first chamber on a downstream side of the composite preform. A vacuum source communicates with the second chamber, including with the cavity.

The composite preform may have a non-uniform thickness. The region of the composite preform may have a thickness greater than an average thickness of the composite preform.

In certain embodiments, the bridge structure is configured to structurally fail at a temperature at or below a cure temperature of the resin.

In particular embodiments, the bridge structure is formed of a thermoplastic material having a melting temperature at or below the cure temperature. In such embodiments, the bridge structure is configured to structurally fail by melting.

The thermoplastic material may have a melting temperature of between 110° C. and 160° C. and more preferably between 120° C. and 140° C.

In one or more embodiments, the bridge structure comprises a roof and at least one wall depending from a periphery of the roof to an edge of the bridge structure located on the first vacuum bagging film.

The bridge structure may have a pair of walls depending from opposing sides of the periphery of the roof.

Alternatively, the bridge structure may have one wall extending about a periphery of the roof.

In one or more preferred embodiments, each wall may flare outwardly toward the edge to define a foot supported by the first vacuum bagging film. A thickness of the foot may taper to the edge.

The features described above may be implemented independently in various embodiments of the present disclosure or may be combined in the other embodiments as will be appreciated by a person skilled in the art.

BRIEF DESCRIPTION OF THE DRAWINGS

Preferred embodiments of the present disclosure will now be described, by way of examples only, with reference to the accompanying drawings wherein:

FIG. 4 is a schematic cross-sectional view of the bridge structure of FIG. 3, taken at cross-section 4-4 of FIG. 3;

FIG. 5 is an enlarged view of detail A of FIG. 4;

DETAILED DESCRIPTION

Methods and systems according to exemplary embodiments of the present disclosure will now be described in detail. In general, methods of resin infusing a composite preform according to the present disclosure include locating a composite preform on an upper tool surface of a tool. A first vacuum bagging film is placed over the tool surface to cover the composite preform and define a sealed first chamber between the tool surface and the first vacuum bagging film. A bridge structure is located on the first vacuum bagging film over a region of the composite preform. The bridge structure has an underside defining a recess forming a cavity above the first vacuum bagging film. A second vacuum bagging film is placed over the first vacuum bagging film and the bridge structure to define a sealed second chamber between the first and second vacuum bagging film. A resin supply communicates with the first chamber on an upstream side of the composite preform. At least partial vacuum pressure is applied to the first chamber on a downstream side of the composite preform to establish a pressure differential to drive resin from the resin supply through the first chamber, thereby infusing the composite preform with resin. Whilst infusing the composite preform, at least partial vacuum pressure is applied to the second chamber, including to the cavity. Whilst infusing the composite preform, the exterior of the second vacuum bagging film is exposed to an exterior pressure, typically to atmospheric pressure. The exterior pressure thus exceeds the at least partial vacuum pressure applied to the first and second chambers. Accordingly, the exterior pressure acts on the composite preform outside of the region covered by the bridge structure so as to compact the composite preform outside of the region. The bridge structure acts to support the second vacuum bagging film against the exterior pressure whilst infusing the composite preform. As a result, the exterior pressure does not act on the region of the composite preform and the region of the composite preform is not compacted. Without compaction of the region of the composite preform, its permeability is not reduced through compaction, which may promote increased resin flow through the region, helping to avoid any resin starvation or dry spots within the region.

Figure 1:
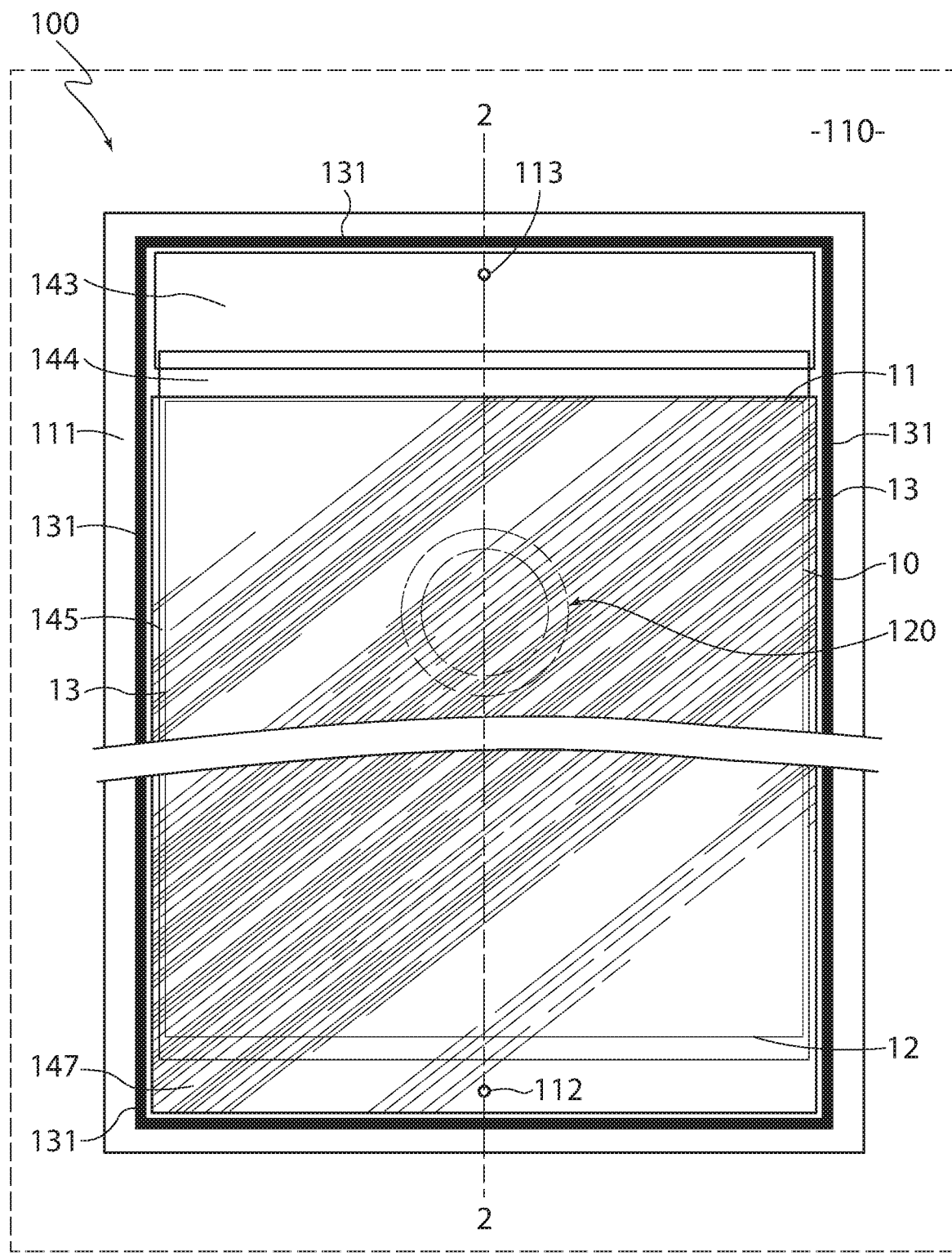
FIG. 1 is a schematic plan view of a system for resin infusing a composite preform according to a first embodiment.

Now referring to FIGS. 1 to 3 of the accompanying drawings, a system 100 for resin infusing a composite preform according to a preferred embodiment will now be described. The system 100 has a tool 110 having an upper tool surface 111 on which the composite preform 10 to be resin infused is located. A first vacuum bagging film 130 covers the composite preform 10 to define a sealed first chamber 140 between the tool surface 111 and the first vacuum bagging film 130. A bridge structure 120 is located on the first vacuum film 130 over a region 16 of the composite preform. The bridge structure 120 has an underside 121 defining a recess forming a cavity 122 above the first vacuum bagging film 130. A second vacuum bagging film 160 is placed over the first vacuum bagging film 130 and the bridge structure 120 to define a sealed second chamber 163 between the first and second bagging films 130, 160. A resin supply 141 communicates with the first chamber 140 on an upstream side of the composite preform 10. In the context of the present specification, upstream and downstream sides of the composite preform 10 are identified with reference to the direction of flow of resin, as will be further described. A first vacuum source 151 communicates with the first chamber 140 on a downstream side of the composite preform 10, and with the second chamber 163, including with the cavity 122. It is also envisaged that separate vacuum sources may communicate with the first and second chambers 140, 163.

The tool 110 may be formed of any of various structural materials, including mild steel, stainless steel, invar or a carbon composite material that will maintain its form at elevated temperatures associated with curing, so as to provide a geometrically stable tool surface 111 though the resin curing process. The tool surface 111 may be substantially flat for the production of composite structures having a substantially flat lower surface, such as wing or fuselage skin panels, or otherwise shaped as desired so as to provide a shaped surface of a non-planar composite structure.

The composite preform 10 may take any form suitable for resin infusion and as dictated by the geometric and structural requirements of the laminated composite structure to be fabricated. The composite preform 10 comprises a layup of multiple plies of reinforcing material, each formed of woven or braided fibres and/or chopped strand mat. The preform plies may be formed of any of various reinforcing fibres, such as carbon, graphite, glass, aromatic polyamide or any other suitable material for forming a resin reinforced laminated composite structure. The plies may form a dry preform, without any resin, or alternatively the preform may have some pre-existing resin content prior to the resin infusion process. The composite preform 10 is located on the tool surface 111 with the lower surface 15 of the preform 10 oriented on the tool surface 111 such that the lower surface of the resulting cured composite structure will match the form of the tool surface 111. The composite preform 10 located on the tool surface 111 has a laterally extending downstream edge 11, an opposing laterally extending upstream edge 12 and opposing longitudinally extending side edges 13. In the context of the present specification, upstream and downstream sides of the composite preform 10 are identified with reference to the direction of flow of resin, as will be further described. The preform 10 may take any desired shape corresponding to the shape of the laminated composite structure to be formed.

Figure 2:
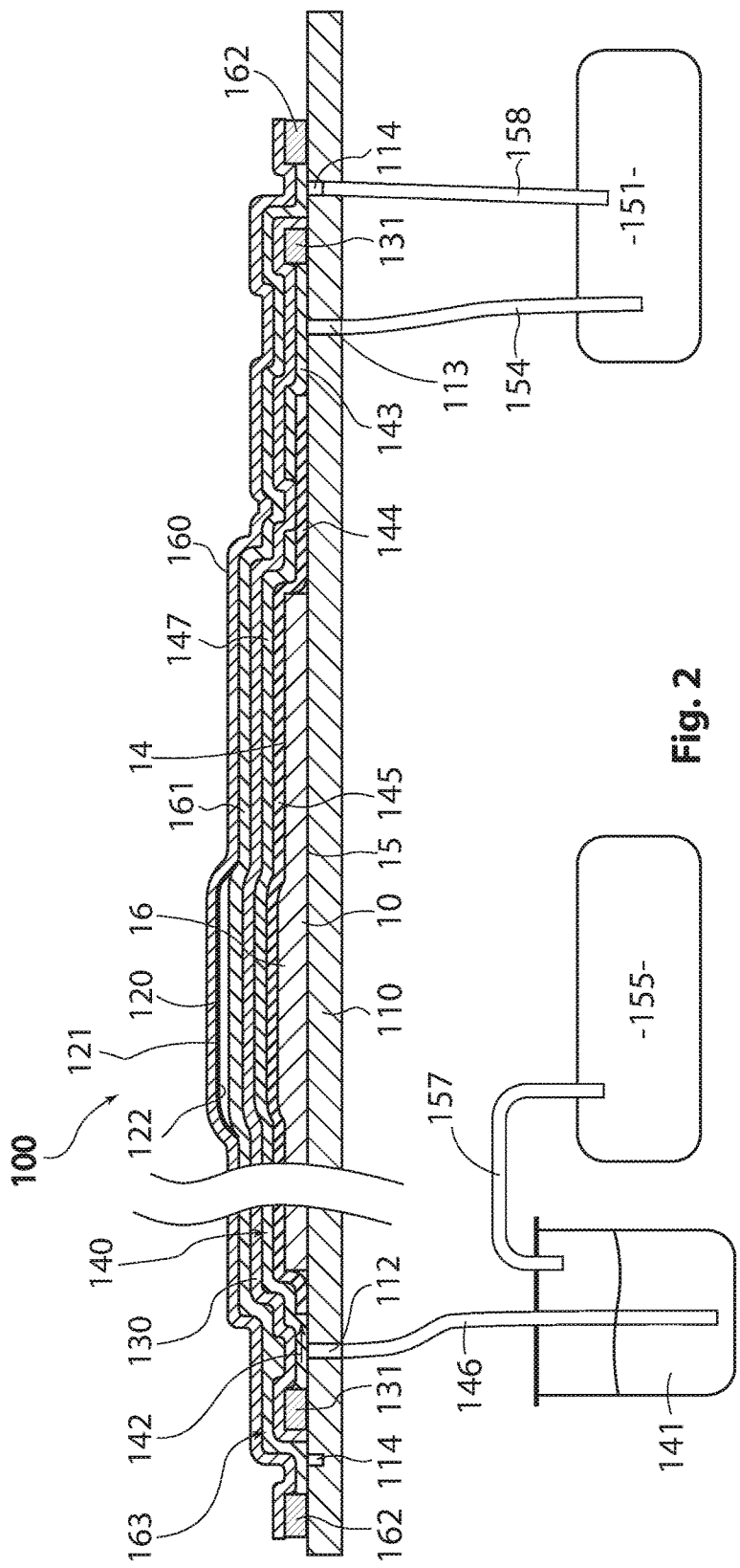
FIG. 2 is a schematic cross-sectional view of the system of FIG. 1 taken at cross-section 2-2.
Figure 3:
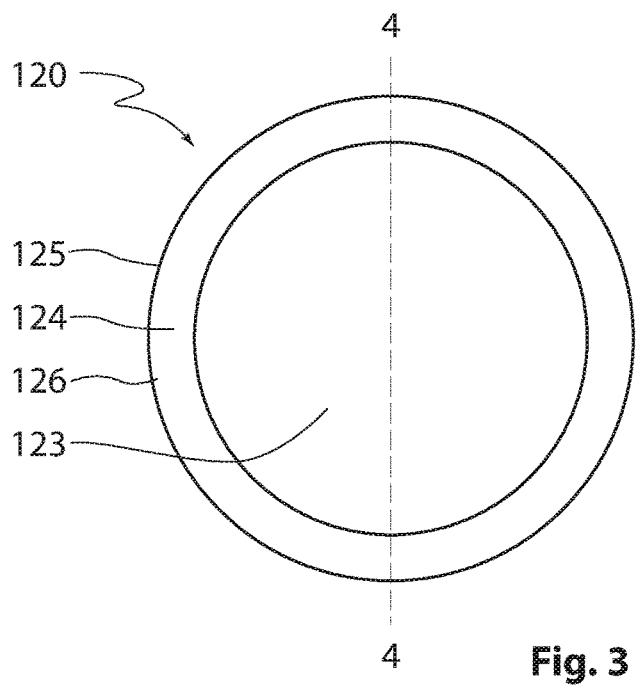
FIG. 3 is a schematic plan view of the bridge structure of the system of FIG. 1.

The composite preform may have a uniform thickness or, alternatively as depicted in the embodiment of FIGS. 2 and 3, the composite preform 10 may have a non-uniform thickness as measured between the upper and lower surfaces 14, 15. Particularly, in the arrangement depicted, the region 16 of the composite preform 10 has a thickness greater than an average thickness of the composite preform 10. In the first embodiment, the thicker region 16 of the composite preform 10 is in the form of a padup, having an increased thickness as a result of being provided with additional plies of reinforcing material to provide local structural reinforcement. Padups, and other portions of composite preforms having a locally increased thickness, generally require a higher volume of resin per unit of preform surface area and may be more susceptible to resin starvation and local dry spots. Other regions of the composite preform 10 that do not have an increased thickness may also be subject to resin starvation and dry spots, such as resulting from particular infusion strategies and geometries.

The resin supply 141 communicates with the first cavity 140 through one or more resin infusion inlets 112 extending through the tool 110 on the upstream side of the composite preform 10, via one or more resin supply pipes 146. The resin supply pipes 146 are typically formed of copper. The first vacuum source 151 communicates with the first chamber 140 through one or more vacuum outlets 113 extending through the tool 110 on a downstream side of the composite preform 10, via one or more vacuum outlet pipes 154, which are also typically formed of copper. In the embodiment depicted, the resin supply 141 also communicates with a second vacuum source 155 via a second vacuum pipe 157.

A flow path 142 extends from the resin supply 141, through the first chamber 140, the composite preform 10 and to the first vacuum source 151. An upstream portion of the flow path 142 comprises the resin supply pipe(s) 146 and resin infusion inlet 112 extending through the tool 110. A mid portion of the flow path 142, defined by the first chamber 140, is formed by the composite preform 10 and various layers of layup materials located beneath the first vacuum bagging film 130. The layup materials include a permeable peel ply 145 located directly on, and extending over, the entirety of the composite preform 10, beyond each of the edges 11, 12, 13 of the composite preform 10, with a downstream portion 144 of the peel ply 145 extending downstream of the downstream edge 11 of the composite preform 10. A layer 147 of permeable flow media is placed over the peel ply 145 and extends beyond the upstream edge of the peel ply 145 to beyond the resin infusion inlet(s) 112. The layer 147 of permeable flow media extends to beyond the downstream edge 11 of the composite preform 10 but does not cover the entirety of the downstream portion 144 of the peel ply 145. The peel ply 145 serves to prevent the layer 147 of permeable flow media from sticking to the composite preform 10 and also provides a path for infusion of resin into the composite preform 10, both along the upstream edge 12 of the composite preform 10 and through the upper surface 14 of the composite preform 10. The peel ply 145 also allows volatiles given off during curing of the resin to be drawn away from the composite preform 10. The peel ply 145 also constitutes a permeable flow media, and may suitably be in the form of a PTFE coated fibreglass fabric, such as Release Ease® 234, available from AirTech International Inc, or any other permeable peel ply material. The layer 147 of permeable flow media provides a passage for the resin through the first chamber 140 along the top of the composite preform 10, along with a path for the escape of volatiles from the first cavity 140. The layer 147 of permeable flow media may suitably be in the form of a nylon mesh material, such as Plastinet® 15231 also available from AirTech International Inc, or any other highly permeable media enabling passage of resin therethrough.

A downstream portion of the flow path 142 comprises a further strip 143 of permeable flow media, the vacuum outlet(s) 113 and vacuum pipe(s) 154. The strip 143 of permeable flow media extends across the downstream edge of the downstream portion 144 of the peel ply 145 and extends further downstream across the vacuum outlet(s) 113. The strip 143 of permeable flow media is typically formed of the same material as the layer 147 of permeable flow media. A gap is located between the layer 147 and strip 143 of permeable flow media.

The first vacuum bagging film 130 extends over the entire layup formed by the composite preform 10, peel ply 145 and layer 147 and strip 143 of permeable flow media. Any of various vacuum bagging film materials may be utilized, including but not limited to Airtech WL7400 or SL800 vacuum bagging films available from Airtech International Inc. The first vacuum bagging film 130 is sealed relative to the tool surface 111 about the periphery of the first vacuum bagging film 130 by way of strips 131 of sealing tape, which may conveniently be in the form of a mastic sealant tape, such as GS-213-3 sealant tape available from AirTech International Inc.

As may be best appreciated from FIG. 2, the first vacuum bagging film 130 defines the upper boundary of the resin flow path 142. In the gap located between the layer 147 and strip 143 of permeable flow media, the vacuum bagging film 142 restricts the thickness of the flow path 142 between the tool upper surface 111 and first vacuum bagging film 130 to the downstream portion 144 of the peel ply 145, which is typically of a reduced permeability as compared to the layer 147 of permeable flow media. All downstream flow of resin is thus restricted through the downstream portion 144 of the peel ply 145, which defines a permeable resin flow control choke.

A breather layer 161, typically being a highly permeable fabric formed of fibreglass or the like is then located over, and fully covering, the first vacuum bagging film 130. A suitable breather layer is a breather cloth formed of a high film non-woven polyester material, such as Airweave® N10, available from Airtech International Inc. The breather layer 161 extends over a vacuum groove 114 that extends around the perimeter of the tool surface 111 and is connected to the first vacuum source 151 (or a separate third vacuum source) by way of a third vacuum pipe 158.

The bridge structure 120 is then located over the first vacuum bagging film 130, on the breather layer 161, located over the region 16 of the composite preform 10. The bridge structure 120 according to a preferred embodiment is depicted in greater detail in FIGS. 3 to 5. In FIGS. 4 and 5, the various materials forming the layup beneath the bridge structure 120 (that is, the composite preform 10, breather layer 145, layer 147, first vacuum bagging film 130 and breather layer 161) are depicted schematically as one mass 180. The bridge structure 120 comprises a roof 123 that spans across the region 16 and at least one wall 124 that depends from a periphery of the roof 123 to an edge 125 of the bridge structure 120 that is located on the breather layer 161 directly over the first vacuum bagging film 130. In the embodiment depicted, the bridge structure 120 is of a general dome type form, with one wall 124 that extends about the periphery of the roof 123. In plan view, the bridge structure 120 may take any suitable shape, typically to roughly match the shape of the region 16. Appropriate shapes may include circular, square, rectangular, elliptical or any other regular or irregular shape. Having a single wall 124 extending about the entire periphery of the roof 123 of the bridge structure 120 may reduce the pressure applied to the upper surface 14 of the composite preform 10, and thereby reduce the possibility of any mark formed on the upper surface 14 due to the local pressure applied by the bridge structure 120.

The wall 124 may flare outwardly toward the edge 125 so as to define a foot 126 that is located on the breather layer 161 directly over, and supported by, the first vacuum bagging film 130. This form of the wall 124 may further reduce the local pressure acting on the upper surface 14 of the composite preform 10 through the wall 124, as opposed, for example, to having a vertically inclined edge of a side wall located on the first vacuum bagging film 130. In the embodiment depicted, the thickness of the foot 126 tapers to the edge 125, so as to generally blend the upper surface of the bridge structure 120 toward the breather layer 161 and the first vacuum bagging film 130 at the edge 125, so as to reduce any step between the upper surface of the bridge structure 120 at the edge 125 and the breather layer 161, which the second vacuum bagging film 160 would otherwise need to bridge and result in an unwanted low pressure region around the periphery of the bridge structure 120 and create a region of higher permeability commonly referred to as "race tracks" by persons skilled in the art of resin infusion.

Figure 6:
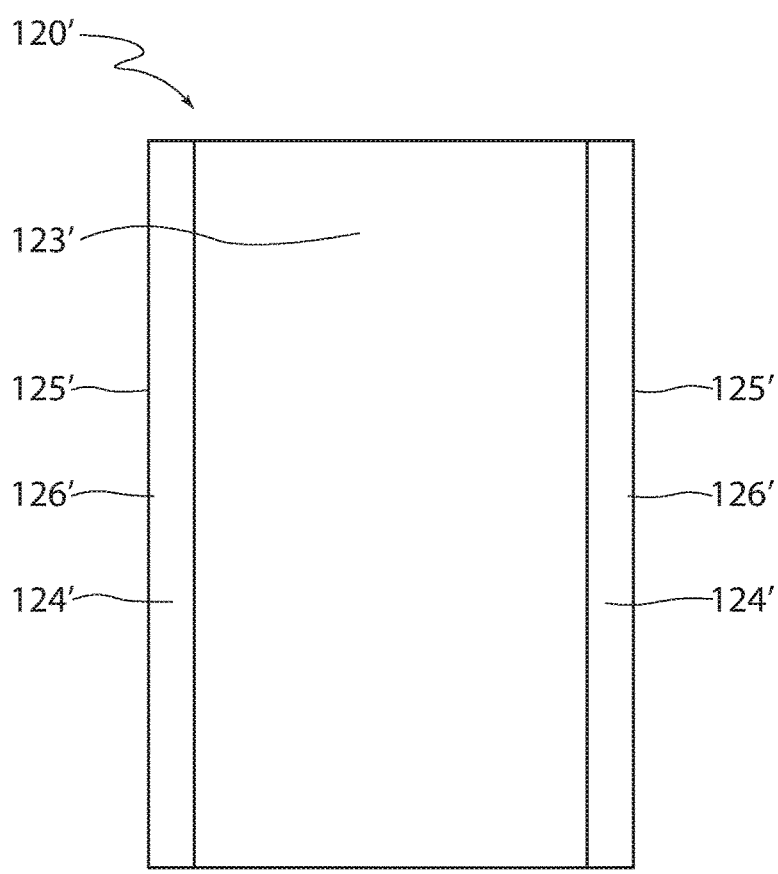
FIG. 6 is a schematic plan view of an alternate form of bridge structure.

Rather than have the wall 124 extend about the entire periphery of the roof 123 of the bridge structure 120, it is envisaged that the bridge structure 120 may be in the general form of a tunnel. Such a modified form of bridge structure 120' is depicted in plan form in FIG. 6. The bridge structure 120' has a pair of opposing side walls 124' depending from opposing sides of the periphery of an elongate roof 123'. The bridge structure 120' has a transverse cross-section generally the same as that of FIG. 4, with each wall 124' flaring outwardly to form a foot 126' at the edge 125' of the bridge structure 120'. This form of bridge structure 120' may be particularly suitable where the bridge structure 120' is to be applied to narrow elongate regions 16.

For configurations where it is desired to locally increase the speed of resin infusion in two adjacent regions, a single bridge structure may be provided defining a pair of adjacent cavities, with a central wall formed therebetween dividing the cavities, with the central wall resting on the breather layer 161.

The appropriate location and size of region 16 for application of one or more bridge structures 120 may be determined through an assessment of the geometry of the composite preform 10, locating a bridge structure 120 on regions of increased thickness which are thus expected to be susceptible to resin starvation. Alternatively or additionally, appropriate regions that are susceptible to resin starvation may be identified by one or more trial resin infusion and subsequent curing processes on a sample composite preform without use of bridge structures 120. Local dry spots that have been subject to resin starvation may then be identified in the cured composite structure.

The bridge structure 120 may be formed of any suitable material capable of supporting the second vacuum bagging film 160 against exterior pressure (typically atmospheric pressure) applied to the system during resin infusion. Where resin infusion is conducted at elevated temperatures, typically in the range of 90° C. to 110° C., the bridge structure 120 should be capable of supporting the second vacuum bagging film 160 at the resin infusion temperature. Suitable materials may include metallic materials such as aluminium, composite materials or plastics with melting temperatures above the resin infusion temperature. In particularly preferred embodiments, the bridge structure may be formed of a thermoplastic material having a melting temperature higher than the resin infusion temperature and lower than or equal to the resin curing temperature, such as between 120° C. and 140° C. for epoxy resins that are resin infused at infusion temperatures of 90° C. to 110° C. and cured at cure temperatures of 180° C. to 200° C. Depending on the infusion and cure temperatures, melting temperatures falling within a broader range of 110° C. to 160° C. may be suitable. This melting will ensure that the bridge structure 120 structurally fails after completion of resin infusion and during heating to the resin curing temperature, collapsing the cavity such that the bridge structure 120 does not support the second vacuum bagging film 160 during curing, as will be further discussed below. Suitable thermoplastic materials may include polyoxyethylene (PE) and polypropylene (PP). Rather than structurally failing by melting, it is also envisaged that the bridge structure 120 may otherwise be configured such that it structurally fails by other means during heating.

The second vacuum bagging film 160 is then located to cover the entire breather layer 161 and bridge structure 120 and is sealed relative to the tool surface 111 by way of further strips 162 of sealing tape, forming the sealed second chamber 163 between the first and second vacuum bagging films 130, 160. The second vacuum bagging film 160 and associated vacuum applied to the second chamber 163 protects against any minor leaks associated with the first vacuum bag 130, with the vacuum applied evacuating any air permeating through the second vacuum bagging film 160 toward the composite preform 10 through the breather layer 161, rather than allowing it to permeate through to the composite preform 10.

In use, once the system 100 has been assembled as discussed above, the resin supply 141 is catalyzed and heated to bring the resin to a suitable resin infusion temperature. Typically the entire system is heated within the oven (or autoclave) that is also used for subsequent curing. The temperature for resin infusion will be dependent upon the resin system utilised, and will typically be selected to provide a suitable viscosity enabling the resin to be drawn through the resin flow path 142. For epoxy resins, suitable infusion temperatures may be in the range of 90° C. to 110° C. Apart from epoxy resins, any other resin suitable for use in resin infusion processes, and as dictated by desired characteristics of the composite structure to be formed, may be utilised. Suitable resins may include epoxy, bismaleimide, benzoxazine, polyimide cyanate esters and polyamide-imide resins.

At least partial vacuum pressure is applied to the downstream end of the first chamber 140, via the first vacuum source 151 and vacuum outlet(s) 113. A smaller partial vacuum (i.e., a higher absolute pressure) may also be applied to the resin supply 141, by way of a second vacuum source 155 connected to a second vacuum pipe 157, as shown in FIG. 3. Where partial vacuum is applied to the resin supply 141 by the second vacuum source 155, a pressure differential may be maintained between the first vacuum source 151 and second vacuum source 155 such that the absolute pressure at the vacuum outlet(s) 113 applied by the first vacuum source 151 is lower than the absolute pressure at the resin supply 141. In one example, a full vacuum (0 mbar/0 kPa) may be applied by the first vacuum source 151 and a higher pressure/lower vacuum of 500 to 800 mbar (50 to 80 kPa) may be applied to the second vacuum source 155, thereby providing a pressure differential of the same amount driving resin from the resin supply 141 through the resin flow path 142. Maintaining at least partial vacuum on the resin supply ensures at least a partial vacuum is maintained throughout the first chamber 140. Full vacuum pressure may also be applied to the resin supply 141 by the second vacuum source 155 prior to resin infusion to degas the resin.

During resin infusion, at least partial vacuum pressure is also applied to the second chamber 163, including to the cavity 122, via the first vacuum source 151 and vacuum groove 114. Where vacuum applied to the second chamber 163 is from the first vacuum source 151, the same vacuum pressure will be applied to both the first and second chambers 140, 163. It is, however, envisaged that the vacuum applied to the second chamber 163 may be via a separate vacuum source, and may be a different partial vacuum pressure to that applied to the first chamber 140.

Resin moves through the first chamber 140 along a wave front, through the layer 147 of permeable flow media, which will generally have a greater permeability than both the peel ply 145 and the composite preform 10, thus forming the path of least resistance. Resin passing through the layer 147 of permeable flow media will infuse down through the less permeable peel ply 145 and into the preform 10. Some resin will also flow laterally through the upstream edge 12 of the composite preform 10 and, to a lesser degree, through the opposing side edges 13 of the composite preform 10. Having the downstream edge 11 of the layer 147 of permeable flow media finish short of both the strip 143 of permeable flow media and the downstream portion 144 of the peel ply 145 prevents resin bypassing the preform 10 and simply being drawn through the layer 147 of permeable flow media directly into the vacuum outlet(s) 113. The rate of advance of the resin wave front is inhibited by forcing the resin to pass downstream longitudinally through a permeable resin flow control choke defined by the downstream portion 144 of the peel ply 145 once it passes the downstream edge 11 of the composite preform 10 and the downstream edge of the layer 147 of permeable flow media.

The exterior of the second vacuum bagging film 160 is exposed to exterior pressure, being the pressure with the oven (or autoclave). This exterior pressure exceeds the pressure applied to the first and second chambers 140, 163 and is typically at least substantially equal to atmospheric pressure (1013 mbar/101.3 kPa), or greater where an autoclave is utilised. This atmospheric pressure acts on the composite preform 10 through the second vacuum bagging film 160, breather layer 161, first vacuum bagging film 130, layer 147 of permeable flow media and peel ply 145, apart from in the region 16 where the bridge structure 120 supports against the atmospheric pressure. The atmospheric pressure acting on the composite preform 10 outside of the region 16 acts to compact the composite preform 10 outside of the region 16, which reduces the permeability of the composite preform 10 outside of the region 16. The bridge structure 10 supports the second vacuum bagging film 160 against the exterior atmospheric pressure. As a result, it is only the at least partial vacuum pressure applied to the cavity 122 that acts against the first vacuum bagging film 130 directly above the region 16. Where the at least partial vacuum pressure applied to the cavity 122 is equal to the at least partial vacuum pressure applied to the first chamber 140, being full vacuum pressure in the preferred embodiment, no net pressure is applied to the composite preform 10 within the region 16 tending to compact the same. Even if the pressure applied to the cavity 122 and first chamber 140 are not equal, the pressure differential acting on the first vacuum bagging film 130 at the region 16 will be less than that applied outside of the region 16. Accordingly, the permeability of the composite preform 10 within the region 16 is not reduced (or is at least not reduced to the same degree as the remainder of the composite preform 10) and is greater than the reduced permeability of the remainder of the composite preform 10. As a result, when the resin wavefront reaches the region 16, the required increased volume of resin is able to preferentially fill the region 16 at a faster rate, enabling full resin infusion of the region 16 rather than having the resin pass beyond the region 16 without full infusion.

The resin infused composite preform 10 is cured by elevating the temperature of the oven to a temperature suitable for curing of the resin. For epoxy resins, curing temperatures of the order of 180° C. to 200° C. will be typical. Full vacuum is typically maintained on the first vacuum source 151 during the curing process, ensuring vacuum pressure remains applied to the first and second chambers 140, 163. Maintaining the vacuum pressure ensures the external pressure applied to the second vacuum bagging film 160 continues to act on the resin infused composite preform (outside of the region 16) throughout curing, ensuring the composite preform remains compacted/consolidated and to assist in curing of the resin.

Whilst the bridge structure 120 remains in place and intact during resin curing, the quality of the composite structure within the region 16 may be compromised through lack of compaction during the resin curing process. This may affect the structural properties of the region 16 and may also result in surface irregularities due to lack of consistent compaction across the extent of the composite preform 10. Accordingly, in a preferred embodiment, the bridge structure 120 structurally fails during heating of the resin infused composite preform 10 to resin curing temperature. Structural failure of the bridge structure 120 collapses the cavity 122 such that the bridge structure 120 does not support the second vacuum bagging film 160 against exterior pressure during curing of the resin infused composite preform 10. The exterior pressure is thus allowed to act on the region 16 of the composite preform 10 during curing, thus compacting the region 16 during the resin curing process, consistent with the remainder of the resin infused composite preform 10. As discussed above, the structural failing of the bridge structure 10 may be by way of melting of the bridge structure 120 at a temperature at or below the resin curing temperature, or by other means, such as by failure of a joint between the roof 123 and wall 124 of the bridge structure 120.

Rather than, or additionally to, configuring the bridge structure 120 to structurally fail during heating of the resin infused composite preform 10 so as to allow exterior pressure to act on the region 16 of the composite preform 10 during curing, it is envisaged that, following resin infusion, pressure may be applied to the second chamber 163, including the cavity 122, via the first vacuum source 151 and vacuum groove 114 (or a separate vacuum source). The absolute pressure applied at this stage will exceed that of the at least partial vacuum pressure applied to the second chamber 163 during resin infusion. As a result, increased pressure in the cavity 122 will provide a net positive pressure on the upper surface of the first bagging film 130, acting to compact the region 16 of the composite preform 10 following resin infusion and prior to curing of the resin. This may therefore address the lack of compaction during resin infusion. The pressure applied to the second chamber 163 may suitably be atmospheric pressure, although pressures exceeding atmospheric pressure, or partial vacuum pressures having an absolute pressure higher than that applied during infusion are also envisaged.

Once the resin is cured, and the system 100 cooled to room temperature, the various consumable layers, including the first and second vacuum bagging films 130, 160, the layer 147 and strip 143 of permeable flow media, peel ply 145 and breather layer 161 are removed, along with the bridge structure 120. The fully formed composite structure may then be removed from the tool surface 111.

Figure 7:
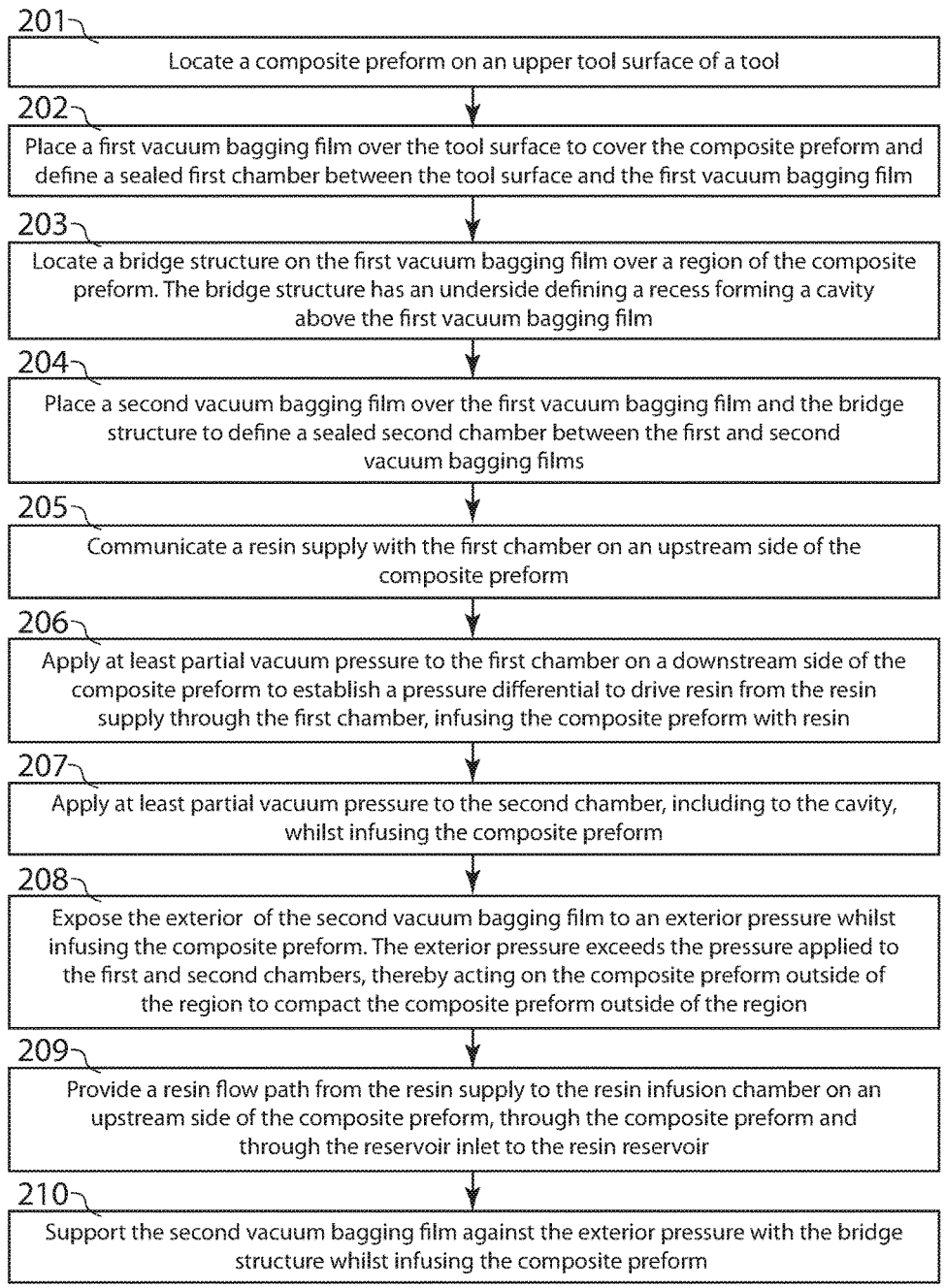
FIG. 7 is a flow chart of an exemplary method for resin infusing a composite preform.

A general method of resin infusing the composite preform as discussed above is depicted in general terms in the flow diagram of FIG. 7.

At block 201 a composite preform is located on an upper tool surface of a tool. At block 202 a first vacuum bagging film is placed over the tool surface to cover the composite preform and define a sealed first chamber between the tool surface and the first vacuum bagging film.

At block 203 a bridge structure is located on the first vacuum bagging film over a region of the composite preform. The bridge structure has an underside defining a recess forming a cavity above the first vacuum bagging film.

At block 204 a second vacuum bagging film is placed over the first vacuum bagging film and the bridge structure to define a sealed second chamber between the first and second vacuum bagging films.

At block 205 a resin supply is communicated with the first chamber on an upstream side of the composite preform.

At block 206 at least partial vacuum pressure is applied to the first chamber on a downstream side of the composite preform to establish a pressure differential to drive resin from the resin supply through the first chamber, infusing the composite preform with resin. At block 207 at least partial vacuum pressure is applied to the second chamber, including to the cavity, whilst infusing the composite preform.

At block 208 the exterior of the second vacuum bagging film is exposed to an exterior pressure whilst infusing the composite preform. The exterior pressure exceeds the pressure applied to the first and second chambers, thereby acting on the composite preform outside of the region to compact the composite preform outside of the region.

At block 209 a resin flow path is provided from the resin supply to the resin infusion chamber on an upstream side of the composite preform, through the composite preform and through the reservoir inlet to the resin reservoir.

At block 210 the second vacuum bagging film is supported against the exterior pressure with the bridge structure whilst infusing the composite preform.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of resin infusing a composite preform, said method comprising:

locating a composite preform on an upper tool surface of a tool;

placing a first vacuum bagging film over said upper tool surface to cover said composite preform and define a sealed first chamber between said upper tool surface and said first vacuum bagging film;

locating a bridge structure over said first vacuum bagging film over a region of said composite preform, said bridge structure having a roof spanning said region of said composite preform, and a single wall extending about an entire periphery of said roof, said wall defining an edge of said bridge structure disposed on said first vacuum bagging film, and said edge supported by a non-perimeter portion of said composite preform outside of said region, said bridge structure having an underside defining a recess forming a cavity above said first vacuum bagging film, said cavity enclosed by the roof, the single wall, and a portion of the first vacuum bagging film located over the composite preform;

placing a second vacuum bagging film over said first vacuum bagging film and said bridge structure to define a sealed second chamber between said first and second vacuum bagging films, when the second vacuum bagging film is viewed from a top-down perspective, the second vacuum bagging film has a second vacuum bagging film portion located exclusively over the bridge structure and a top face of the composite preform, and the bridge structure is substantially smaller in size than the second vacuum bagging film portion;

communicating a resin supply with said first chamber on an upstream side of said composite preform;

applying at least partial vacuum pressure to said first chamber on a downstream side of said composite preform to establish a pressure differential to drive resin from said resin supply through said first chamber, infusing said composite preform with resin;

applying at least partial vacuum pressure to said second chamber, including to said cavity, whilst infusing said composite preform;

exposing an exterior of said second vacuum bagging film to an exterior pressure whilst infusing said composite preform, said exterior pressure exceeding the at least partial pressure applied to said first and second chambers, thereby acting on said composite preform outside of said region to compact said composite preform outside of said region; and supporting said second vacuum bagging film against said exterior pressure with said bridge structure whilst infusing said composite preform.

2. The method of claim 1, wherein said exterior pressure is substantially equal to, or greater than, atmospheric pressure.

3. The method of claim 1, wherein said region of said composite preform is susceptible to resin starvation.

4. The method of claim 1, wherein locating said composite preform comprises locating a composite preform having a non-uniform thickness on said upper tool surface, and said region of said composite preform has a thickness greater than an average thickness of said composite preform.

5. A method of fabricating a composite structure, said method comprising:
resin infusing a composite preform according to the method of claim 1 to form a resin infused composite preform; and
curing said resin infused composite preform.

6. The method of claim 5, further comprising, whilst curing said resin infused composite preform, applying a pressure to said second chamber, including to said cavity, exceeding the at least partial vacuum pressure applied to the first chamber and the at least partial vacuum pressure applied to the second chamber whilst infusing said composite preform.

7. The method of claim 5, wherein curing said resin infused composite preform comprises heating said resin infused composite preform to a cure temperature, said bridge structure structurally failing during said heating, collapsing said cavity, such that said bridge structure does not support said second vacuum bagging film during curing of said resin infused composite preform, allowing said exterior pressure to act on said region of said composite preform during curing.

8. The method of claim 7, wherein locating said bridge structure comprises locating a bridge structure formed of a thermoplastic material with a melting temperature at or below said cure temperature, said bridge structure structurally failing by melting.

9. The method of claim 8 wherein said thermoplastic material has a melting temperature of between 110° C. and 160° C.

10. A resin infusion system for resin infusing a composite preform including a region, said system comprising:

a tool having an upper tool surface supporting said composite preform;

a first vacuum bagging film covering said composite preform to define a sealed first chamber between said first vacuum bagging film and said upper tool surface;

a second vacuum bagging film covering said first vacuum bagging film to define a sealed second chamber between said first and second vacuum bagging films, an exterior of said second vacuum bagging film being exposed to exterior pressure;

a bridge structure located in said second chamber, said bridge structure including a roof spanning said region of said composite preform, and a single wall extending about an entire periphery of said roof, said wall defining an edge of said bridge structure disposed on said first vacuum bagging film, and said edge supported by a portion of said composite preform outside of said region, said bridge structure having an underside defining a recess forming a cavity above said first vacuum bagging film, said cavity enclosed by the roof, the single wall, and a portion of the first vacuum bagging film located over the composite preform;

a resin supply communicating with said first chamber on an upstream side of said composite preform;

a vacuum source communicating with said first chamber on a downstream side of said composite preform;

a vacuum source communicating with said second chamber, including with said cavity;

wherein, when the resin infusion system is viewed from a top-down perspective:
the second vacuum bagging film has a second vacuum bagging film portion located exclusively over the bridge structure and a top face of the composite preform; and
the bridge structure is substantially smaller in size than the second vacuum bagging film portion, such that the second vacuum bagging film applies the exterior pressure to the bridge structure and to the top face of the composite preform when at least partial vacuum pressure is applied to the first and second chambers.

11. The system of claim 10, wherein said composite preform has a non-uniform thickness, said region of said composite preform having a thickness greater than an average thickness of said composite preform.

12. The system of claim 10, wherein said bridge structure is configured to structurally fail at a temperature at or below a cure temperature of said resin.

13. The system of claim 12, wherein said bridge structure is formed of a thermoplastic material having a melting temperature at or below said cure temperature, said bridge structure being configured to structurally fail by melting.

14. The system of claim 13, wherein said thermoplastic material has a melting temperature of between 110° C. and 160° C.

15. The system of claim 13, wherein said thermoplastic material has a melting temperature between 120° C. and 140° C.

16. The system of claim 10, in which said vacuum source communicating with said first chamber is configured to generate a first vacuum pressure and said vacuum source communicating with said second chamber is configured to generate a second vacuum pressure, wherein said first vacuum pressure is equal to said second vacuum pressure.

17. A resin infusion system for resin infusing a composite preform including a region, said system comprising:
a tool having an upper tool surface supporting said composite preform;

a first vacuum bagging film covering said composite preform to define a sealed first chamber between said first vacuum bagging film and said upper tool surface;

a second vacuum bagging film covering said first vacuum bagging film to define a sealed second chamber between said first and second vacuum bagging films, an exterior of said second vacuum bagging film being exposed to exterior pressure;

a bridge structure located in said second chamber, said bridge structure including a roof spanning said region of said composite preform, and at least one wall depending from a periphery of said roof, said at least one wall defining an edge of said bridge structure disposed on said first vacuum bagging film and supported by a portion of said composite preform outside of said region, said bridge structure having an underside defining a recess forming a cavity above said first vacuum bagging film, said cavity enclosed by the roof, the at least one wall, and a portion of the first vacuum bagging film located over the composite preform, said at least one wall oriented at a non-perpendicular angle to the first vacuum bagging film, and having a first thickness that flares outwardly towards said edge to define a foot having a width that is greater than the first thickness of the wall, the foot supported on said first vacuum bagging film;

a resin supply communicating with said first chamber on an upstream side of said composite preform;

a vacuum source communicating with said first chamber on a downstream side of said composite preform; and a vacuum source communicating with said second chamber, including with said cavity.

18. The system of claim 17, wherein said bridge structure has a pair of said walls depending from opposing sides of said periphery of said roof.

19. The system of claim 18, wherein each said wall flares outwardly towards said edge to define a foot supported by said first vacuum bagging film.

20. The system of claim 19, wherein a thickness of said foot tapers to said edge.

\* \* \* \* \*